(12) United States Patent
Ozaki et al.

(10) Patent No.: US 9,150,269 B2
(45) Date of Patent: Oct. 6, 2015

(54) EVAPORATION SYSTEM FOR MOTORCYCLE, AND MOTORCYCLE INCORPORATING THE SAME

(75) Inventors: Yoshinobu Ozaki, Saitama (JP); Takeshi Shimura, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 738 days.

(21) Appl. No.: 13/427,214

(22) Filed: Mar. 22, 2012

(65) Prior Publication Data
US 2012/0247433 A1 Oct. 4, 2012

(30) Foreign Application Priority Data
Mar. 31, 2011 (JP) ................................. 2011-077676

(51) Int. Cl.
*F02M 25/08* (2006.01)
*B62J 37/00* (2006.01)
*F02M 35/16* (2006.01)

(52) U.S. Cl.
CPC .............. *B62J 37/00* (2013.01); *F02M 25/089* (2013.01); *F02M 25/0836* (2013.01); *F02M 25/0872* (2013.01); *F02M 35/162* (2013.01)

(58) Field of Classification Search
CPC .......... F02M 25/0854; F02M 25/0836; F02M 25/08; F02M 25/089; F02M 25/0809
USPC .......................................... 123/519, 520, 521
See application file for complete search history.

(56) References Cited

U.S. PATENT DOCUMENTS

2010/0051369 A1* 3/2010 Kuramochi et al. ......... 180/69.4
2011/0308874 A1* 12/2011 Tanaka .......................... 180/219

FOREIGN PATENT DOCUMENTS

JP 2010-052659 A 3/2010

* cited by examiner

*Primary Examiner* — Hai Huynh
*Assistant Examiner* — Raza Najmuddin
(74) *Attorney, Agent, or Firm* — Carrier Blackman & Associates, P.C.; Joseph P. Carrier; William D. Blackman

(57) ABSTRACT

In a motorcycle including an engine equipped with an inlet system, a crankcase and a cylinder block; and a fuel tank which supplies fuel to the engine, an evaporation system is formed in a compact manner using the layout space above the crankcase. The evaporation system includes a canister which temporarily traps evaporated fuel evaporated inside the fuel tank; a purge device which introduces the evaporated fuel trapped in the canister into the inlet system; and a fresh air filter which filters air introduced to the canister during a purging operation for making the inlet system suction the evaporated fuel. In such evaporation system, the canister is disposed in the rear of the cylinder block and above the crankcase, and the air filter is disposed between the cylinder block and the canister.

17 Claims, 3 Drawing Sheets

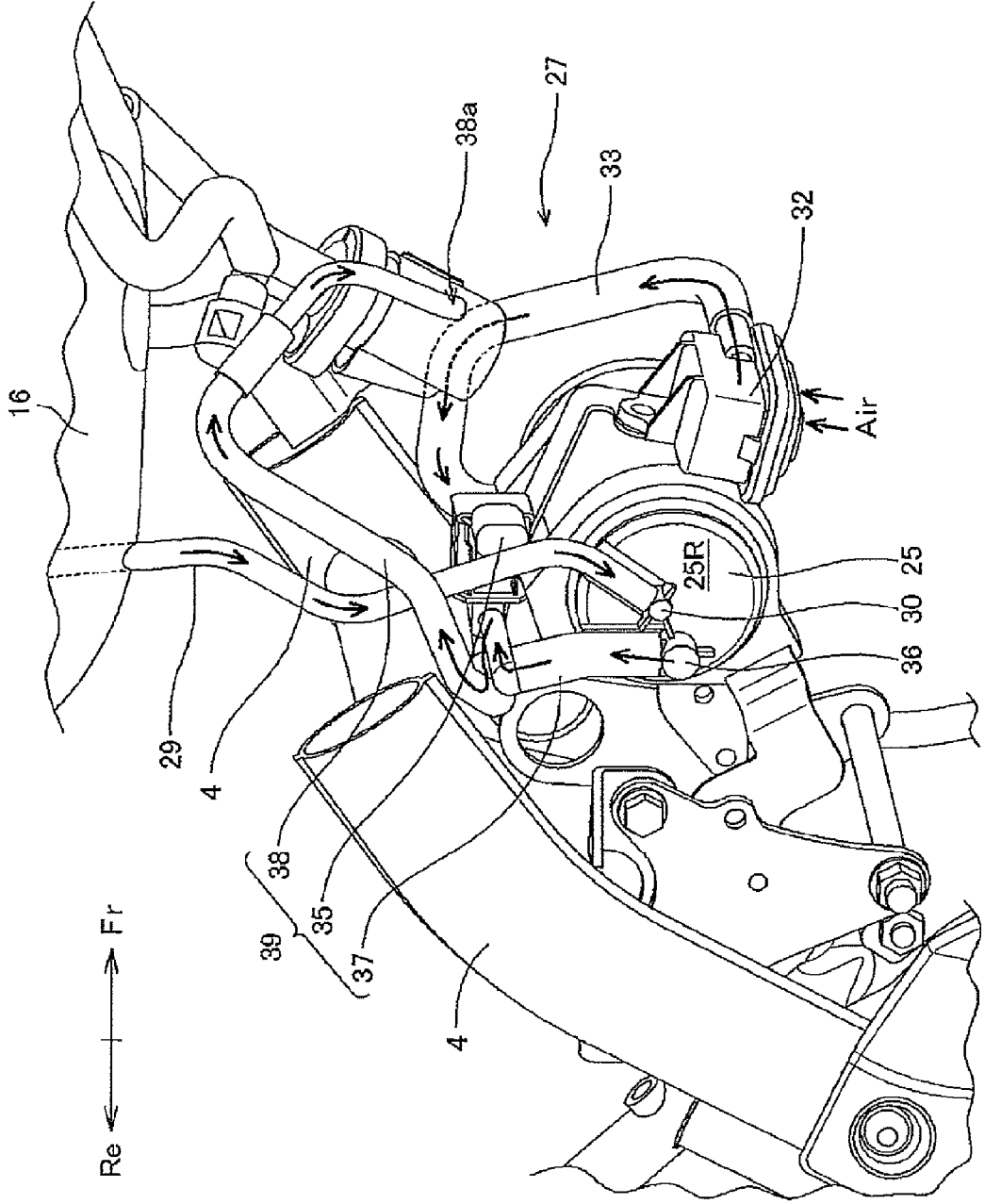

EVAPORATION SYSTEM FOR MOTORCYCLE, AND MOTORCYCLE INCORPORATING THE SAME

CROSS-REFERENCE TO RELATED APPLICATIONS

The present invention claims priority under 35 USC 119 based on Japanese patent application No. 2011-077676, filed on Mar. 31, 2011. The entire subject matter of this priority document, including specification claims and drawings thereof, is incorporated by reference herein.

BACKGROUND OF THE INVENTION

1. Field of the Invention

The present invention relates to an evaporated fuel treatment system for a motorcycle, and a motorcycle incorporating the same. More particularly, the present invention relates to an evaporation system formed in a compact manner, in which a canister is disposed in a rear of a cylinder block and above a crankcase of an engine, and an air filter is disposed between the cylinder block and the canister, and to a motorcycle incorporating the same.

2. Description of the Background Art

The evaporated fuel treatment system, which is ordinarily known as an evaporation system, prevents evaporated fuel generated in a fuel tank from evaporating into the outside air and supplies the evaporated fuel to an internal combustion engine.

In such known evaporation system, ordinarily a canister is disposed in the vicinity of a center stand, and a fresh air filter for purifying fresh air introduced into the canister is disposed under a carburetor. An example of such evaporation system is disclosed in the Japanese Unexamined Patent Application Publication No. 2010-52659. However, in this case, there is a problem in that since the canister and the fresh air filter are spaced apart from each other, the connected pipes become longer.

The present has been made to overcome such drawbacks of the existing evaporation system. Accordingly, it is one of the objects of the present invention to form an evaporation system in a compact manner using a layout space above a crankcase.

SUMMARY OF THE INVENTION

In order to achieve the above objects, the present invention according to a first aspect thereof provides an evaporation system (27) of a motorcycle (M). The motorcycle (M) includes an engine (12) equipped with an inlet system, a crankcase (13), a cylinder block (21), a cylinder head (22), and a cylinder head cover (23); and a fuel tank (16) supplying fuel to the engine (12). The evaporation system includes a canister (25) which temporarily traps evaporated fuel evaporated inside the fuel tank (16); a purge device (39) including a purge pipe (38) and a purge control valve (35), both of which communicate the canister (25) with the inlet system, and making the inlet system suction the evaporated fuel trapped in the canister (25); a fresh air filter (32) which purifies fresh air introduced into the canister (25) during the purging operation for making the inlet system suction the evaporated fuel; and a fresh air supply pipe (33) which extends from said fresh air filter to said purge device. The evaporation system is characterized in that the canister (25) is disposed in the rear of the cylinder block (21) and above the crankcase (13); the fresh air filter (32) is disposed between the cylinder block (21) and the canister (25).

The present invention according to a second aspect thereof, in addition to the first aspect, is characterized in that an inlet of the fresh air filter (32) is opened to the upper surface side of the crankcase (13).

The present invention according to a third aspect thereof, in addition to the first aspect, is characterized in that the fresh air filter (32) is disposed above a starter motor (26).

The present invention according to a fourth aspect thereof, in addition to the first aspect, is characterized in that the fresh air filter (32) is overlapped with a cam chain tensioner (31) when viewed in a side view.

The present invention according to a fifth aspect thereof, in addition to the first aspect, is characterized in that the canister (25) is disposed under a throttle body (24).

The present invention according to a sixth aspect thereof, in addition to the first aspect, is characterized in that the fresh air filter (32) and the purge control valve (35) are disposed adjacent to the outer periphery of the canister (25).

Effects of the Invention

According to the first aspect of the present invention, the evaporation system (27) can be formed in a compact manner using a layout space above the crankcase (13). Moreover, the fresh air supply pipe (33) arranged between the fresh air filter (32) and the canister (25) can be shortened. Furthermore, the fresh air filter (32) can be disposed at a position where dust is hardly suctioned.

According to the second aspect of the present invention, the suction of the dust can be reduced.

According to the third aspect of the present invention, the dead space above the starter motor (26) can be effectively utilized.

According to the fourth aspect of the present invention, the layout efficiency of the evaporation system is increased. Moreover, a compact arrangement is available.

According to the fifth aspect of the present invention, the layout efficiency of the evaporation system is increased. Moreover, a compact arrangement is available.

According to the sixth aspect of the present invention, the components of the evaporation system can be centralized and arranged efficiently.

For a more complete understanding of the present invention, the reader is referred to the following detailed description section, which should be read in conjunction with the accompanying drawings. Throughout the following detailed description and in the drawings, like numbers refer to like parts.

BRIEF DESCRIPTION OF THE DRAWINGS

FIG. 3 is a perspective view of the right side of the evaporation system.

DETAILED DESCRIPTION OF ILLUSTRATIVE EMBODIMENTS

An embodiment of the present invention will now be described, with reference to the drawings. Throughout this description, relative terms like "upper", "lower", "above", "below", "front", "back", and the like are used in reference to a vantage point of an operator of the vehicle, seated on the driver's seat and facing forward. It should be understood that these terms are used for purposes of illustration, and are not intended to limit the invention.

Figure 1:
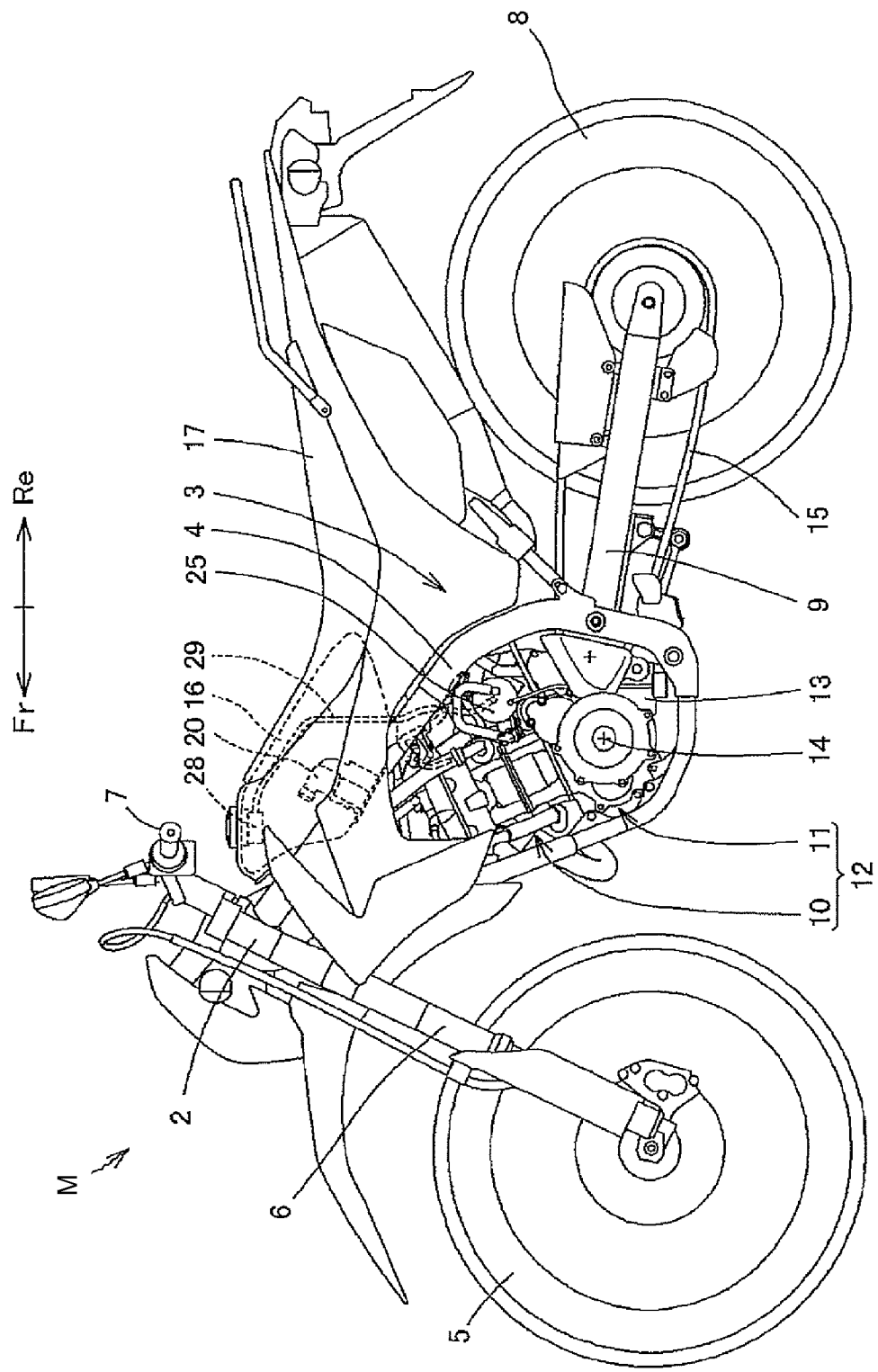
FIG. 1 is a left side plan view of a motorcycle in an illustrative embodiment according to the present invention.

FIG. 1 is a left side plan view of a motorcycle M of an illustrative embodiment according to the present invention. Arrows Fr and Re in the drawings show the front and rear directions with reference to a motorcycle M.

In FIG. 1, a head pipe 2 is provided at a front end portion of the vehicle. A vehicle body frame 3 has a pair of main frames 4 separated into right and left from the head pipe 2 and gradually inclining downward and backward, and then extending backwardly. A front fork 6 supporting a front wheel 5 is steerably supported on the head pipe 2. A steering handle 7 is connected to the upper portion of the front fork 6. A rear fork 9 supporting a rear wheel 8 is vertically and swingably supported on the vehicle body frame 3 through a suspension.

A power unit (engine) 12 including an internal combustion engine 10 integrated with a transmission unit 11 is mounted on the vehicle body frame 3. A crank shaft 14 and a shift shaft (not shown) are contained in a crankcase 13 of the engine 12. The power of the engine 12 is transmitted to the rear wheel 8 through a chain transfer device 15. A fuel tank 16 is arranged above the vehicle body frame 3. A seat 17 is disposed behind the fuel tank 16.

Figure 2:
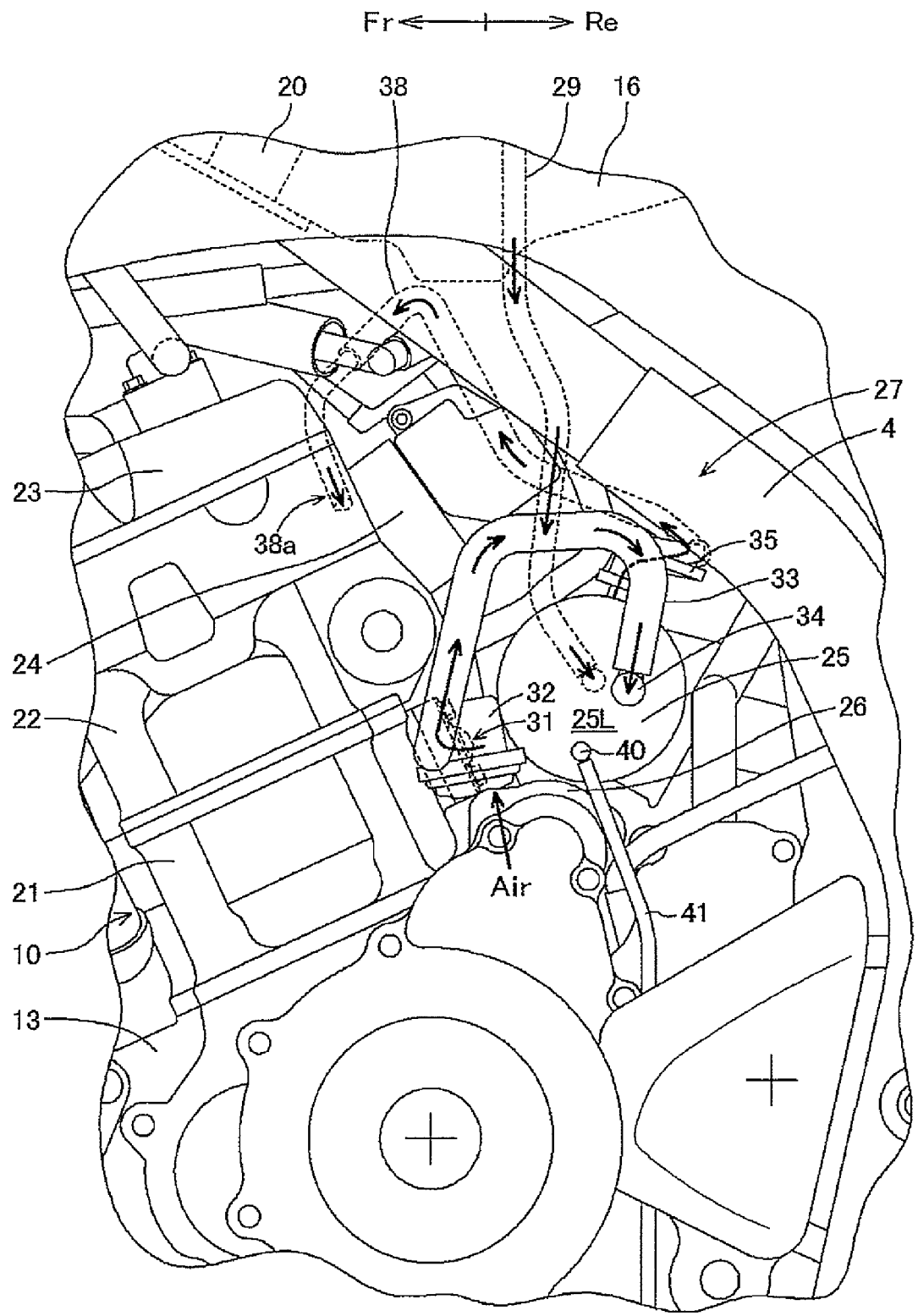
FIG. 2 is an enlarged left side plan in view the vicinity of the engine of the motorcycle.

FIG. 2 is an enlarged left side plan view in the vicinity of the internal combustion engine 10. A fuel pump 20 is provided inside the fuel tank 16 provided above the main frame 4. A cylinder block 21, a cylinder head 22, and a cylinder head cover 23 are orderly connected on the upper surface of the crankcase 13 in the ascending order. A throttle body 24 is connected on the rear portion of the cylinder head 22. A canister 25 is provided under the throttle body 24. A starter motor 26 is attached on the upper surface of the crankcase 13. The canister 25 is closely provided adjacent to the upper side of the starter motor 26.

An evaporation system (evaporated fuel treatment system) 27 for returning the evaporated fuel evaporated inside the fuel tank 16 to the inlet system and supplying the evaporated fuel to the internal combustion engine 10 is provided in the motorcycle M.

The evaporation system 27 is the system which performs suction of the evaporated fuel inside the fuel tank 16, and supplies such evaporated fuel to the air-fuel mixture into the inlet system of the internal combustion engine 10 which is subsequently allowed to combust.

FIG. 3 is a perspective view of the right side of the evaporation system 27. As shown in FIG. 3, the evaporated fuel is supplied into the canister 25 through a fuel vapor discharge pipe 29 connected to a gas liquid separation device 28 (FIG. 1) provided at the upper portion inside the fuel tank 16, and then through a connected portion 30 of a right side end plate 25R of the canister 25. The canister 25, a reservoir in a cylindrical shape, is filled up with grains of activated carbon inside thereof. The activated carbon absorbs the evaporated fuel.

As shown in FIG. 2, a cam chain tensioner 31 is provided in the rear portion of a cam chain chamber (not shown) in the right side of the cylinder block 21. In a side view, a fresh air filter 32 is provided at the position where the cam chain tensioner 31 is overlapped and adjacent to the front side of the canister 25. The outside air is supplied into the canister 25 through a fresh air supply pipe 33 connected to the fresh air filter 32 and through a connected portion 34 of a left side end plate 25L of the canister 25.

As shown in FIG. 3, a purge control valve 35 is provided on the upper surface of the canister 25. The purge control valve 35 is connected to the canister 25 through a purge control valve entrance pipe 37 connected to a connected portion 36 of the right side end plate 25R of the canister 25. A purge pipe 38 is extended from the purge control valve 35. The front end 38a is connected to the intake passage (not shown) formed in the cylinder head 22. The portion, which comprises the purge control valve entrance pipe 37, the purge control valve 35, and the purge pipe 38, is called as a purge device 39.

As shown in FIG. 2, a drain pipe 41 connected to the connected portion 40 of the left side end plate 25L of the canister 25 extends downwardly. The lower end of the drain pipe 41 is opened to the outside air for draining the water generated inside the canister 25.

The operation of the evaporation system 27 having the above-mentioned constitution is explained as below.

The evaporated fuel flowed into the canister 25 through the fuel vapor discharge pipe 29 is temporally absorbed by the activated carbon. When the vehicle speed is maintained for a predetermined time, the purge control valve 35 is opened. The evaporated fuel is separated from the activated carbon by the fresh air introduced into the canister 25 through the fresh air filter 32 and the fresh air supply pipe 33, and is suctioned into the intake passage (not shown) through the purge control valve entrance pipe 37, the purge control valve 35, and the purge pipe 38.

The purge control valve 35 connected to the purge pipe 38 is a valve for controlling the suction volume of the evaporated fuel for preventing the air fuel ratio of the air-fuel mixture from drastically fluctuating due to a large amount of evaporated fuel suction into the carburetor (not shown), and a device allowing the flow of the evaporated fuel from the canister 25 to the intake passage only if the vehicle speed has been maintained faster than given for a certain period of time. Moreover, an inlet of the fresh air filter 32 connected to the fresh air supply pipe 33 is downwardly opened in the upper surface side of the crankcase 13, prevents the suction of dust into the canister 25.

The above-mentioned embodiment having the constitution and operation provides benefits as below.

(1) The canister 25 is disposed in the rear of the cylinder block 21 and above the crankcase 13, and the fresh air filter 32 is disposed between the cylinder block 21 and the canister 25. Accordingly, the evaporation system 27 can be formed in a compact manner using the layout space above the crankcase 13. Moreover, the fresh air supply pipe 33 between the fresh air filter 32 and the canister 25 can be shortened. Furthermore, the fresh air filter 32 can be disposed at the position where the dust is hardly suctioned.

(2) Due to the fact that the inlet of the fresh air filter 32 is opened to the upper surface side of the crankcase 13, the suction of dust can be reduced.

(3) Due to the fact that the fresh air filter 32 is disposed above the starter motor 26, the dead space above the starter motor 26 can be utilized.

(4) Due to the fact that the fresh air filter 32 is overlapped with the cam chain tensioner 31 when viewed in a side view, the layout efficiency is increased. In addition, the compact arrangement is available.

(5) Due to the fact that the canister 25 is disposed under the throttle body 24, the layout efficiency is increased. In addition, the compact arrangement is available.

(6) Due to the fact that the fresh air filter 32 and the purge control valve 35 are disposed adjacent to the outer periphery of the canister 25, the components can be centralized and arranged efficiently.

Although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. In an evaporation system for a motorcycle, said motorcycle comprising:
an engine equipped with a crankcase, a cylinder block, a cylinder head, a cylinder head cover, and inlet system;
a fuel tank supplying fuel to said engine; and
a cam chain tensioner,
said evaporation system comprising:
a canister which temporarily traps evaporated fuel evaporated inside said fuel tank;
a purge device comprising a purge pipe and a purge control valve, both of which communicate with said canister connected with the inlet system, and making the inlet system suction the evaporated fuel trapped in the canister;
a fresh air filter which purifies fresh air introduced into the canister during a purging operation for making the inlet system suction the evaporated fuel; and
a fresh air supply pipe which extends from said fresh air filter to said purge device;
wherein the evaporation system is characterized in that
said canister is disposed at a rear of said cylinder block and above said crankcase, and
said fresh air filter is disposed between said cylinder block and said canister, and said fresh air filter is overlapped with the cam chain tensioner when viewed in a side view.

2. An evaporation system of a motorcycle according to claim 1 is characterized in that an inlet of the fresh air filter is opened to an upper surface side of the crankcase.

3. An evaporation system of a motorcycle according claim 1, wherein said motorcycle further comprises a starter motor; and wherein the evaporation system is characterized in that the fresh air filter is disposed above the starter motor.

4. An evaporation system of a motorcycle according to claim 1, wherein said motorcycle further comprises a throttle body; and wherein said evaporation system is characterized in that said canister is disposed below the throttle body.

5. An evaporation system of a motorcycle according to claim 1 is characterized in that said fresh air filter and the purge control valve are disposed adjacent to an outer periphery of the canister.

6. A motorcycle comprising
an engine having a crankcase and a cylinder block;
a fuel tank which supplies fuel to said engine;
a cam chain tensioner;
a canister which temporarily traps evaporated fuel evaporated inside said fuel tank;
a purge device which communicates with said canister;
an air filter purifying fresh air introduced into the canister during the purging operation for making the inlet system suction the evaporated fuel;
a fresh air supply pipe;
the evaporation system is characterized in that
said canister is disposed at a rear of said cylinder block and above said crankcase, and
said fresh air filter is disposed between said cylinder block and said canister, and said air filter overlaps said cam chain tensioner when viewed in a side view.

7. A motorcycle according to claim 6, wherein an inlet of the air filter is arranged around an upper surface side of the crankcase.

8. A motorcycle according claim 6, further comprising a starter motor; wherein said air filter is disposed at a position above the starter motor.

9. A motorcycle according to claim 6, further comprising a throttle body; and wherein said canister is disposed at a position below the throttle body.

10. A motorcycle according to claim 6, wherein said air filter is disposed adjacent to an outer periphery of the canister.

11. A motorcycle according to claim 6, wherein said purge device comprises a purge control valve disposed adjacent to an outer periphery of the canister.

12. A motorcycle according to claim 6, wherein said purge device comprises a purge control valve disposed on an upper surface of the canister.

13. An evaporation system for a vehicle, said vehicle comprising an engine having a crankcase and a cylinder block; and a fuel tank which supplies fuel to said engine;
said evaporation system comprising
a canister which temporarily traps fuel evaporated inside said fuel tank;
a purge device which communicates with said canister;
an air filter which filters air introduced into the canister during a purging operation;
an air supply pipe which operatively connects said air filter with said purge device;
wherein
said canister is disposed at a rear of said cylinder block and above said crankcase; and
said air filter is disposed between said cylinder block and said canister, and said air filter overlaps said cam chain tensioner when viewed in a side view.

14. An evaporation system according to claim 13, wherein an inlet of the air filter is arranged around an upper surface side of the crankcase.

15. An evaporation system according to claim 13, where said vehicle further comprises a starter motor; and wherein said air filter is disposed above the starter motor.

16. An evaporation system according to claim 13, wherein said vehicle further comprises a throttle body; and wherein said canister is disposed below the throttle body.

17. An evaporation system according to claim 13, wherein said purge device comprises a purge control valve; and wherein said air filter and said purge control valve are disposed adjacent to an outer periphery of the canister.

* * * * *